United States Patent
Gonring (10) Patent No.: US 10,640,190 B1
(45) Date of Patent: May 5, 2020

(54) SYSTEM AND METHOD FOR CONTROLLING COURSE OF A MARINE VESSEL

(71) Applicant: Brunswick Corporation, Lake Forest, IL (US)

(72) Inventor: Steven J. Gonring, Slinger, WI (US)

(73) Assignee: Brunswick Corporation, Mettawa, IL (US)

( * ) Notice: Subject to any disclaimer, the term of this patent is extended or adjusted under 35 U.S.C. 154(b) by 321 days.

(21) Appl. No.: 15/415,095

(22) Filed: Jan. 25, 2017

Related U.S. Application Data (60) Provisional application No. 62/301,887, filed on Mar. 1, 2016.

(51) Int. Cl.
*B63H 25/00* (2006.01)
*B63H 25/42* (2006.01)
(Continued)

(52) U.S. Cl.
CPC ........... *B63H 25/04* (2013.01); *G05D 1/0206* (2013.01); *B63H 2025/022* (2013.01); *B63H 2025/045* (2013.01)

(58) Field of Classification Search
CPC .. G05D 1/0206; G01C 21/3691; B60K 35/00; B60K 2370/15; B60W 2550/402; B60W 50/0097; B60W 50/10; B60W 30/0956; B63G 8/08; B63H 25/04; B63H 21/22; B63H 25/42
See application file for complete search history.

(56) References Cited

U.S. PATENT DOCUMENTS 2,360,361 A 10/1944 Louis
3,145,683 A 8/1964 Kolb et al.
(Continued)

FOREIGN PATENT DOCUMENTS

EP 816962 A1 7/1998
EP 2161542 A1 3/2010
(Continued)

OTHER PUBLICATIONS

Arbuckle et al., "Station Keeping Methods," Unpublished U.S. Appl. No. 15/445,031, filed Feb. 28, 2017.
(Continued)

*Primary Examiner* — Tuan C To
*Assistant Examiner* — Paul A Castro
(74) *Attorney, Agent, or Firm* — Andrus Intellectual Property Law, LLP (57) ABSTRACT

A method for controlling a course of a marine vessel powered by a marine engine as it moves in a body of water includes determining a current global position and a current heading of the vessel and initiating an auto-waypoint mode of a vessel course control system. In response to initiation of the auto-waypoint mode, the method includes setting a course for the vessel based on a current position of a steering wheel of the system and the vessel's current global position. The method thereafter includes automatically rotating a steerable component coupled to the vessel and rotatable to affect a direction of movement of the vessel so as to counteract external forces on the vessel and thereby to maintain the vessel's set course.

18 Claims, 5 Drawing Sheets

(51) Int. Cl.
*G05D 1/00* (2006.01)
*B63H 25/04* (2006.01)
*G05D 1/02* (2020.01)
*B63H 25/02* (2006.01)

(56) References Cited

U.S. PATENT DOCUMENTS

| | | | |
|---|---|---|---|
| 3,177,348 A | 4/1965 | Daniloff | |
| 3,187,704 A | 6/1965 | Shatto, Jr. et al. | |
| 3,688,252 A | 8/1972 | Thompson | |
| 3,715,571 A | 2/1973 | Braddon | |
| 3,771,483 A | 11/1973 | Spencer | |
| 4,253,149 A | 2/1981 | Cunningham et al. | |
| 4,257,718 A | 3/1981 | Rosa et al. | |
| 4,428,052 A | 1/1984 | Robinson et al. | |
| 4,513,378 A | 4/1985 | Antkowiak | |
| 4,769,773 A | 9/1988 | Shatto, Jr. | |
| 4,939,661 A | 7/1990 | Barker et al. | |
| 4,975,709 A | 12/1990 | Koike | |
| 5,172,324 A | 12/1992 | Knight | |
| 5,202,835 A | 4/1993 | Knight | |
| 5,331,558 A | 7/1994 | Hossfield et al. | |
| 5,362,263 A | 11/1994 | Petty | |
| 5,386,368 A | 1/1995 | Knight | |
| 5,390,125 A | 2/1995 | Sennott et al. | |
| 5,491,636 A | 2/1996 | Robertson et al. | |
| 5,736,962 A | 4/1998 | Tendler | |
| 5,884,213 A | 3/1999 | Carlson | |
| 6,059,226 A | 5/2000 | Cotton et al. | |
| 6,092,007 A | 7/2000 | Cotton et al. | |
| 6,230,642 B1 | 5/2001 | McKenney et al. | |
| 6,273,771 B1 | 8/2001 | Buckley et al. | |
| 6,308,651 B2 | 10/2001 | McKenney et al. | |
| 6,377,889 B1 | 4/2002 | Soest | |
| 6,446,003 B1 | 9/2002 | Green et al. | |
| 6,485,341 B1 | 11/2002 | Lanyi et al. | |
| 6,604,479 B2 | 8/2003 | McKenney et al. | |
| 6,611,737 B1 * | 8/2003 | El-Tahan | G05D 1/0206 701/21 |
| 6,678,589 B2 | 1/2004 | Robertson et al. | |
| 6,848,382 B1 | 2/2005 | Bekker | |
| 6,995,527 B2 | 2/2006 | DePasqua | |
| 7,140,315 B2 | 11/2006 | Okuyama | |
| 7,267,068 B2 | 9/2007 | Bradley et al. | |
| 7,268,703 B1 | 9/2007 | Kabel et al. | |
| 7,305,928 B2 | 12/2007 | Bradley et al. | |
| 7,366,593 B2 | 4/2008 | Fujimoto et al. | |
| 7,398,742 B1 | 7/2008 | Gonring | |
| 7,416,458 B2 | 8/2008 | Suemori et al. | |
| 7,476,134 B1 | 1/2009 | Fell et al. | |
| 7,538,511 B2 | 5/2009 | Samek | |
| 7,561,886 B1 | 7/2009 | Gonring et al. | |
| 7,577,526 B2 | 8/2009 | Kim et al. | |
| 7,630,798 B2 | 8/2009 | Mossman et al. | |
| 7,727,036 B1 | 6/2010 | Poorman et al. | |
| 8,050,630 B1 | 11/2011 | Arbuckle | |
| 8,082,100 B2 | 12/2011 | Grace et al. | |
| 8,145,370 B2 | 3/2012 | Borrett | |
| 8,145,371 B2 | 3/2012 | Rae et al. | |
| 8,150,621 B1 | 4/2012 | Phillips et al. | |
| 8,155,811 B2 | 4/2012 | Noffsinger et al. | |
| 8,215,252 B1 | 7/2012 | Chun | |
| 8,265,812 B2 | 9/2012 | Pease | |
| 8,326,472 B2 | 12/2012 | Igarashi et al. | |
| 8,417,399 B2 | 4/2013 | Arbuckle et al. | |
| 8,478,464 B2 | 7/2013 | Arbuckle et al. | |
| 8,480,445 B2 | 7/2013 | Morvillo | |
| 8,510,028 B2 | 8/2013 | Grace et al. | |
| 8,515,660 B2 | 8/2013 | Grace et al. | |
| 8,515,661 B2 | 8/2013 | Grace et al. | |
| 8,527,192 B2 | 9/2013 | Grace et al. | |
| 8,543,324 B2 | 9/2013 | Grace et al. | |
| 8,645,012 B2 | 2/2014 | Salmon et al. | |
| 8,694,248 B1 | 4/2014 | Arbuckle et al. | |
| 8,761,976 B2 | 6/2014 | Salmon et al. | |
| 8,777,681 B1 | 7/2014 | McNalley et al. | |
| 8,807,059 B1 | 8/2014 | Samples et al. | |
| 8,808,041 B2 | 8/2014 | Hine et al. | |
| 8,831,868 B2 | 9/2014 | Grace et al. | |
| 8,924,054 B1 | 12/2014 | Arbuckle et al. | |
| 9,039,468 B1 | 5/2015 | Arbuckle et al. | |
| 9,110,467 B2 | 8/2015 | Yuet et al. | |
| 9,132,900 B2 | 9/2015 | Salmon et al. | |
| 9,132,903 B1 | 9/2015 | Gable et al. | |
| 9,162,743 B2 | 10/2015 | Grace et al. | |
| 9,248,898 B1 | 2/2016 | Kirchhoff et al. | |
| 9,359,057 B1 | 6/2016 | Andrasko et al. | |
| 9,377,780 B1 | 6/2016 | Arbuckle et al. | |
| 9,676,464 B2 | 6/2017 | Johnson et al. | |
| 9,733,645 B1 | 8/2017 | Andrasko et al. | |
| 9,904,293 B1 | 2/2018 | Heap et al. | |
| 9,927,520 B1 | 3/2018 | Ward et al. | |
| 9,952,595 B2 | 4/2018 | Arbuckle et al. | |
| 10,095,232 B1 | 10/2018 | Arbuckle et al. | |
| 2003/0191562 A1 | 10/2003 | Robertson et al. | |
| 2004/0006423 A1 * | 1/2004 | Fujimoto | G05D 1/0206 701/467 |
| 2004/0221787 A1 | 11/2004 | McKenney et al. | |
| 2005/0092225 A1 | 5/2005 | Kaji et al. | |
| 2005/0164569 A1 | 7/2005 | Kaji et al. | |
| 2005/0170713 A1 | 8/2005 | Okuyama | |
| 2006/0089794 A1 | 4/2006 | DePasqua | |
| 2006/0116796 A1 | 6/2006 | Fossen et al. | |
| 2007/0017426 A1 | 1/2007 | Kaji et al. | |
| 2007/0032923 A1 | 2/2007 | Mossman et al. | |
| 2007/0089660 A1 | 4/2007 | Bradley et al. | |
| 2007/0162207 A1 * | 7/2007 | Shimo | B63H 25/04 701/42 |
| 2007/0178779 A1 | 8/2007 | Takada et al. | |
| 2007/0089654 A1 | 9/2007 | Bradley et al. | |
| 2007/0233389 A1 | 10/2007 | Stephens | |
| 2008/0027597 A1 * | 1/2008 | Barrett | B63H 25/04 701/21 |
| 2009/0037040 A1 | 2/2009 | Salmon et al. | |
| 2009/0076671 A1 | 3/2009 | Mizutani | |
| 2009/0171520 A1 | 7/2009 | Kaji | |
| 2009/0276148 A1 | 11/2009 | Ardvisson | |
| 2010/0023192 A1 | 1/2010 | Rae et al. | |
| 2010/0070124 A1 | 3/2010 | Yeager et al. | |
| 2010/0109944 A1 | 5/2010 | Whitehead et al. | |
| 2011/0153126 A1 | 6/2011 | Arbuckle et al. | |
| 2011/0288714 A1 | 11/2011 | Flohr et al. | |
| 2012/0129410 A1 | 5/2012 | Tyers | |
| 2012/0130570 A1 | 5/2012 | Pease | |
| 2012/0248259 A1 | 10/2012 | Page et al. | |
| 2013/0080044 A1 | 3/2013 | Tyers et al. | |
| 2013/0297104 A1 | 11/2013 | Tyers et al. | |
| 2014/0114509 A1 | 4/2014 | Venables et al. | |
| 2014/0316657 A1 * | 10/2014 | Johnson | G05D 1/0206 701/42 |
| 2014/0362661 A1 | 12/2014 | Muijzert et al. | |
| 2015/0089427 A1 | 3/2015 | Akuzawa | |
| 2015/0277442 A1 | 10/2015 | Ballou | |
| 2015/0321740 A1 | 11/2015 | Bradley et al. | |
| 2015/0346730 A1 | 12/2015 | Stephens et al. | |
| 2016/0016651 A1 | 1/2016 | Anderson et al. | |
| 2016/0039500 A1 | 2/2016 | Heyring et al. | |
| 2016/0061980 A1 | 3/2016 | Tonchia et al. | |
| 2016/0101838 A1 | 4/2016 | Kojima | |
| 2016/0125739 A1 | 5/2016 | Stewart et al. | |
| 2016/0246300 A1 | 8/2016 | Langford-Wood | |
| 2016/0252907 A1 | 9/2016 | Parkinson | |
| 2016/0299507 A1 | 10/2016 | Shah et al. | |
| 2016/0334792 A1 | 11/2016 | Jopling | |
| 2017/0205828 A1 | 7/2017 | Estabrook | |
| 2017/0205829 A1 | 7/2017 | Tyers | |
| 2017/0210449 A1 | 7/2017 | Frisbie et al. | |
| 2017/0255200 A1 | 9/2017 | Arbuckle et al. | |
| 2017/0277189 A1 | 9/2017 | Johnson et al. | |
| 2017/0349257 A1 | 12/2017 | Hara et al. | |
| 2017/0365175 A1 | 12/2017 | Harnett | |
| 2018/0015994 A1 | 1/2018 | Kishimoto et al. | |
| 2018/0106619 A1 | 4/2018 | Johnson et al. | |
| 2018/0231980 A1 | 8/2018 | Arbuckle et al. | |

(56) References Cited

U.S. PATENT DOCUMENTS

| | | |
|---|---|---|
| 2018/0284815 A1 | 10/2018 | Cui et al. |
| 2019/0286169 A1 | 9/2019 | Cui et al. |
| 2019/0359300 A1 | 11/2019 | Johnson et al. |

FOREIGN PATENT DOCUMENTS

| | | |
|---|---|---|
| EP | 2952994 | 12/2015 |
| GB | 1173442 | 12/1969 |
| JP | 58061097 | 4/1983 |
| JP | 05-203638 A | 8/1993 |
| JP | 7223591 | 8/1995 |
| JP | 2926533 B2 | 7/1997 |
| JP | 11-129978 A | 5/1999 |
| JP | 2001-287697 | 10/2001 |
| JP | 2002-178990 | 6/2002 |
| JP | 2002173091 A | 6/2002 |
| JP | 2003276677 A | 10/2003 |
| JP | 200442884 A | 2/2004 |
| JP | 2004355105 A | 12/2004 |
| JP | 2005-200004 | 7/2005 |
| JP | 2006-137309 | 6/2006 |
| JP | 2006137309 | 6/2006 |
| JP | 2006137309 A | 6/2006 |
| JP | 2009-227035 | 10/2009 |
| JP | 2009-241738 | 10/2009 |
| JP | 2009-538782 A | 11/2009 |
| JP | 2011128943 | 6/2011 |
| JP | 5042906 B2 | 7/2012 |
| JP | 2012528417 A | 11/2012 |
| JP | 5226355 B2 | 7/2013 |
| JP | 2014065495 | 4/2014 |
| JP | 200546034 A | 2/2015 |
| WO | 9205505 A1 | 4/1992 |
| WO | WO 2014033457 | 3/2014 |
| WO | WO 2016104031 | 6/2016 |
| WO | WO 2017095235 A1 | 6/2017 |

OTHER PUBLICATIONS

Arbuckle et al., "Station Keeping Methods," Unpublished U.S. Appl. No. 15/887,372, filed Feb. 2, 2018.

Arbuckle et al., "Methods for Positioning Marine Vessels," Unpublished U.S. Appl. No. 16/028,019, filed Jul. 5, 2018.

Poorman et al., Multilayer Control System and Method for Controlling Movement of a Marine Vessel, Unpublished U.S. Appl. No. 11/965,583, filed Dec. 27, 2007.

Ward et al., "Method and System for Close Proximity Collision Detection", U.S. Appl. No. 14/807,217, filed Jul. 23, 2015.

Poorman et al., "Multilayer Control System and Method for Controlling Movement of a Marine Vessel", U.S. Appl. No. 11/965,583, filed Dec. 27, 2007.

Andrasko et al., "System and Method for Controlling Handling of a Marine Vessel", U.S. Appl. No. 14/484,702, filed Sep. 12, 2014.

Lucas, G.W., "A Path Following a Circular Arc to a Point at a Specified Range and Bearing", web article, Jan. 11, 2006, website available at: http://rossum.sourceforge.net/papers/CalculationsForRobotics/CirclePath.htm.

\* cited by examiner

SYSTEM AND METHOD FOR CONTROLLING COURSE OF A MARINE VESSEL

CROSS-REFERENCE TO RELATED APPLICATION

The present application claims the benefit of U.S. Provisional Application Ser. No. 62/301,887, filed on Mar. 1, 2016, which is hereby incorporated by reference.

FIELD

The present disclosure relates to automatic positioning systems and methods for marine vessels.

BACKGROUND

U.S. Pat. No. 6,273,771, which is hereby incorporated by reference herein, discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 7,305,928, which is hereby incorporated by reference herein, discloses a vessel positioning system that maneuvers a marine vessel in such a way that the vessel maintains its global position and heading in accordance with a desired position and heading selected by the operator of the marine vessel. When used in conjunction with a joystick, the operator of the marine vessel can place the system in a station keeping enabled mode and the system then maintains the desired position obtained upon the initial change in the joystick from an active mode to an inactive mode. In this way, the operator can selectively maneuver the marine vessel manually and, when the joystick is released, the vessel will maintain the position in which it was at the instant the operator stopped maneuvering it with the joystick.

U.S. Pat. No. 8,478,464, which is hereby incorporated by reference herein, discloses systems and methods for orienting a marine vessel to enhance available thrust in a station keeping mode. A control device having a memory and a programmable circuit is programmed to control operation of a plurality of marine propulsion devices to maintain orientation of a marine vessel in a selected global position. The control device is programmed to calculate a direction of a resultant thrust vector associated with the plurality of marine propulsion devices that is necessary to maintain the vessel in the selected global position. The control device is programmed to control operation of the plurality of marine propulsion devices to change the actual heading of the marine vessel to align the actual heading with the thrust vector.

Other patents describing various autopilot, station keeping, and waypoint tracking features and related system and method improvements include: U.S. Pat. Nos. 7,267,068; 7,561,886; 8,050,630; 8,417,399; 8,694,248; 8,777,681; 8,807,059; 8,924,054; 9,039,468; 9,132,903; 9,248,898; 9,377,780; 9,733,645; and 9,927,520. Each of these patents and applications is hereby incorporated by reference herein.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

One example of the present disclosure is of a system for controlling a course of a marine vessel powered by a marine engine as it moves in a body of water. The system includes a steering wheel rotatable to a plurality of positions and a steerable component coupled to the vessel and rotatable to affect a direction of movement of the vessel in response to rotation of the steering wheel in a manual steering mode. A navigation system determines a current global position and a current heading of the vessel. A mode selection device is configured to initiate an auto-waypoint mode of the system. A control module is in signal communication with the steering wheel, the steerable component, the navigation system, and the mode selection device. In response to initiation of the auto-waypoint mode, the control module sets a course for the vessel based on a current position of the steering wheel and the vessel's current global position. The control module thereafter commands the steerable component to rotate automatically to counteract external forces on the vessel to thereby maintain the vessel's set course.

According to another example of the present disclosure, a method for controlling a course of a marine vessel powered by a marine engine as it moves in a body of water includes determining a current global position and a current heading of the vessel and initiating an auto-waypoint mode of a vessel course control system. In response to initiation of the auto-waypoint mode, the method includes setting a course for the vessel based on a current position of a steering wheel of the system and the vessel's current global position. The method thereafter includes automatically rotating a steerable component coupled to the vessel and rotatable to affect a direction of movement of the vessel so as to counteract external forces on the vessel and thereby to maintain the vessel's set course.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity and understanding. No unnecessary limitations are to be inferred therefrom beyond the requirement of the prior art because such terms are used for descriptive purposes only and are intended to be broadly construed.

Figure 1:
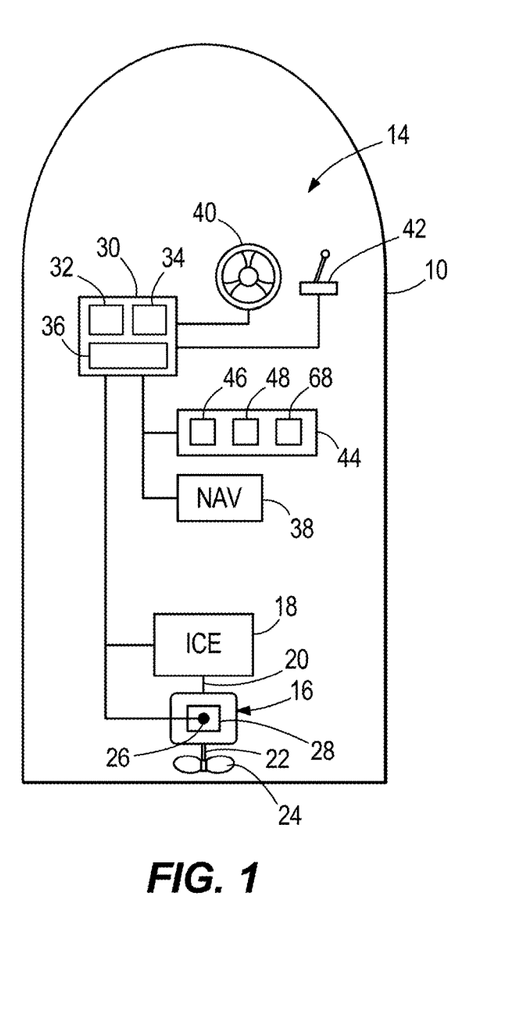
FIG. 1 illustrates a schematic view of a marine vessel according to the present disclosure.
Figures 3, 4:
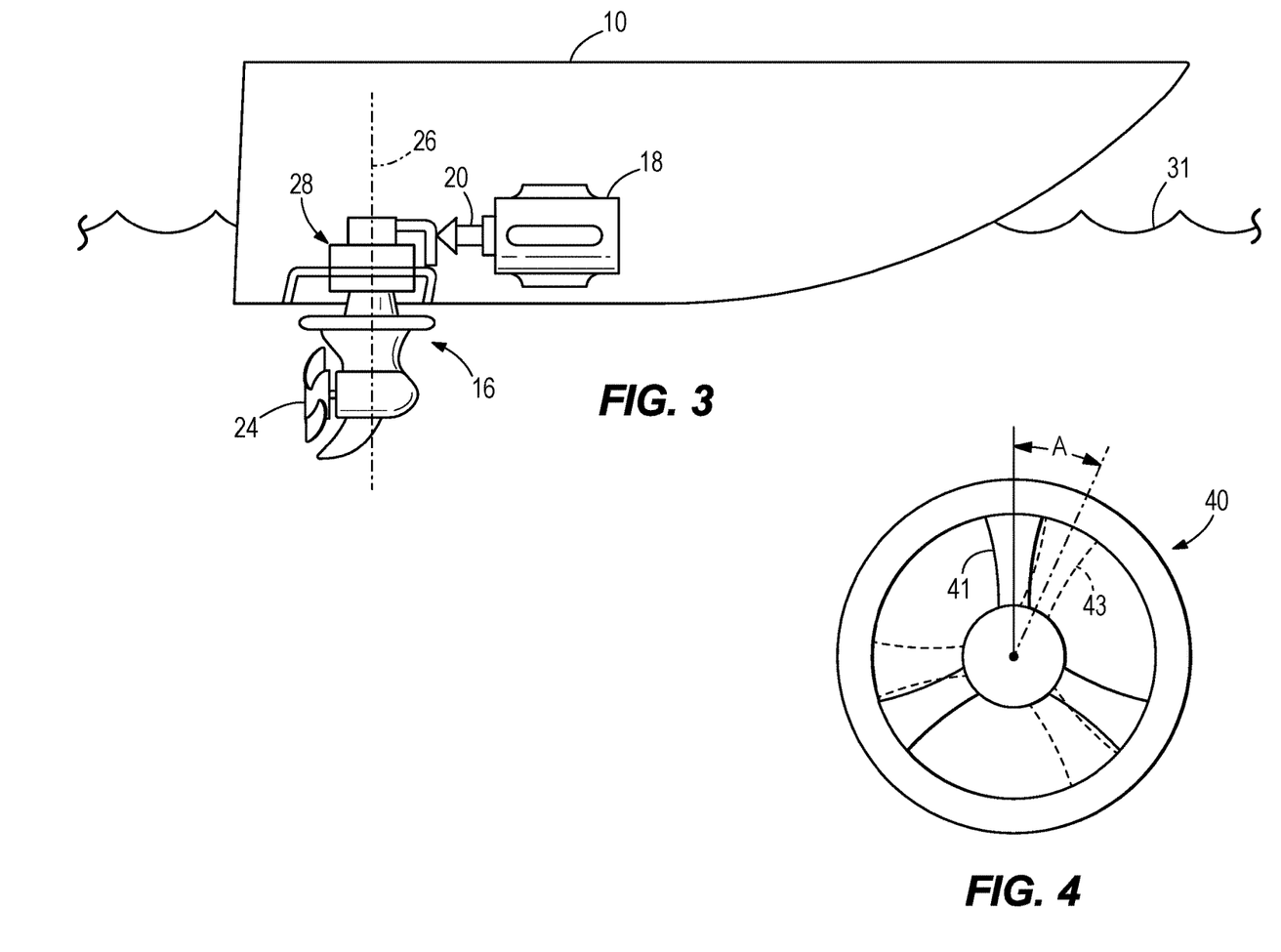
FIG. 3 illustrates a schematic cross-sectional side view of a marine vessel according to the present disclosure.
FIG. 4 illustrates an exemplary user input device for providing an operator-initiated steering command to the steerable component(s) of the marine vessel.

FIG. 1 illustrates a marine vessel 10 with a steerable component 16 located proximate a stern of the marine vessel 10. Referring also to FIG. 3, in the example shown, the steerable component 16 is a pod drive; however, the steerable component 16 could comprise any of an outboard motor, a stern drive, or a jet drive. Alternatively, if the marine vessel 10 were provided with an inboard drive, the steerable component 16 could be a rudder. The steerable component 16 is coupled in torque transmitting relationship with an internal combustion engine 18 via an output shaft 20. The steerable component 16 includes a propeller shaft 22 that connects to a propeller 24. When torque is transmitted from the internal combustion engine 18 via the shaft 20 to the propeller shaft 22 and the propeller 24, a thrust is produced to propel the marine vessel 10 in a direction that corresponds to a steering position of the steerable component 16. In the example of FIGS. 1 and 3, the steerable component 16 is steerable around a vertical steering axis 26, it being understood that different types of marine vessels and steerable components may have steering axes that are not vertically aligned. The steering axis 26 runs through a steering actuator 28, which actuates the steerable component 16 to one of a plurality of positions so as to control direction of movement of the marine vessel 10. The steering actuator 28 may be a hydraulic piston-cylinder combination, a rack and pinion device, or any other steering actuator for a steerable marine device known to those having ordinary skill in the art. In the example shown, the steering system is therefore a steer-by-wire system, in which no mechanical linkages are provided between the helm and the steering actuator 28. Rather, the steering actuator 28 moves the steerable component 16 to desired steering angles in response to the output signals from the control module 30.

The internal combustion engine 18 and the steering actuator 28 are communicatively connected to a control module 30, and together make up a portion of a control system 14 for controlling a course of the vessel 10 as it moves in a body of water 31 (FIG. 3). Returning to FIG. 1, the control module 30 is programmable and includes a processing system (e.g. processor 32) and a storage system (e.g. memory 34). The control module 30 can be located anywhere on the vessel 10 and/or located remote from the vessel 10 and can communicate with various components of the vessel 10 via a peripheral interface and wired and/or wireless links, as will be explained further herein below. Although FIG. 1 shows one control module 30, the vessel 10 can include more than one control module. Portions of the method disclosed herein below can be carried out by a single control module or by several separate control modules. For example, the system 14 can have a control module located at or near a helm of the vessel 10 and can also have control module(s) located at or near the steerable component 16. If more than one control module is provided, each can control operation of a specific device or sub-system on the vessel 10.

In some examples, the control module 30 may include a computing system that includes a processing system, storage system, software, and input/output (I/O) interface 36 for communicating with peripheral devices. The systems may be implemented in hardware and/or software that carries out a programmed set of instructions. For example, the processing system loads and executes software from the storage system, such as software programmed with a method for steering a vessel, which directs the processing system to operate as described herein below in further detail. The computing system may include one or more processors, which may be communicatively connected. The processing system can comprise a microprocessor, including a control unit and a processing unit, and other circuitry, such as semiconductor hardware logic, that retrieves and executes software from the storage system. The processing system can be implemented within a single processing device but can also be distributed across multiple processing devices or sub-systems that cooperate according to existing program instructions. The processing system can include one or many software modules comprising sets of computer executable instructions for carrying out various functions as described herein.

As used herein, the term "control module" may refer to, be part of, or include an application specific integrated circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip (SoC). A control module may include memory (shared, dedicated, or group) that stores code executed by the processing system. The term "code" may include software, firmware, and/or microcode, and may refer to programs, routines, functions, classes, and/or objects. The term "shared" means that some or all code from multiple modules may be executed using a single (shared) processor. In addition, some or all code from multiple control modules may be stored by a single (shared) memory. The term "group" means that some or all code from a single control module may be executed using a group of processors. In addition, some or all code from a single control module may be stored using a group of memories.

The storage system can comprise any storage media readable by the processing system and capable of storing software. The storage system can include volatile and non-volatile, removable and non-removable media implemented in any method or technology for storage of information, such as computer-readable instructions, data structures, software modules, or other data. The storage system can be implemented as a single storage device or across multiple storage devices or sub-systems. The storage system can include additional elements, such as a memory controller capable of communicating with the processing system. Non-limiting examples of storage media include random access memory, read-only memory, magnetic discs, optical discs, flash memory, virtual and non-virtual memory, various types of magnetic storage devices, or any other medium which can be used to store the desired information and that may be accessed by an instruction execution system. The storage media can be a transitory storage media or a non-transitory storage media such as a non-transitory tangible computer readable medium.

The control module 30 communicates with one or more components on the vessel 10 via the I/O interface 36 and a communication link, which can be a wired or wireless link, and is shown schematically herein by lines connecting the control module 30 to various components. The control module 30 is capable of monitoring and controlling one or more operational characteristics of the system 14 and its various subsystems by sending and receiving control signals via the communication link. In one example, the communication link is a controller area network (CAN) bus, but other types of links could be used. Note that the connections shown herein are not the only way the communications link can be configured.

The control module 30 and various associated software modules functionally convert input signals, such as but not limited to vessel control signals, to output signals, such as but not limited to actuator control signals, according to the computer executable instructions. Each of the input signals can be split into more than one branch, depending on how many functions are to be carried out and/or how many actuators are to be controlled with each of the input signals. The input signals may be fed to several software modules within the control module 30 through branch signals. The exact signals input into the software modules can be taken directly from the corresponding control input device or sensor, or could be pre-processed in some way, for example by scaling through an amplifier or by converting to or from a digital signal or an analog signal using a digital-to-analog or an analog-to-digital converter. It should be appreciated that more than one input signal can be combined to provide an output signal, in which case the individual input signals may be input to the same software modules or may each be provided to an individual software module. Note that in the event that more than one signal is used to generate an output signal, a post-processing module, such as a summer, a selector, or an averaging module is used to combine the input signals into an output signal.

The provided description of the control module 30 is conceptual and should be interpreted generally, as those skilled in the art will recognize many ways to implement such a control module. These include implementation using a digital microprocessor that receives input signals or branch signals and performs a calculation using the input signals to produce the corresponding output signals or actuator control signals. Also, analog computers may be used, which comprise circuit elements arranged to produce the desired outputs. Furthermore, look-up tables containing predetermined or calibrated data points may be stored in any fashion to provide the desired output corresponding to a given input signal.

A navigation system 38 that determines a current global position and a current heading of the vessel 10 is also connected to the control module 30. The navigation system 38 may include a global positioning system (GPS) receiver, a heading sensor, and a yaw rate sensor which may be provided as separate units or combined into one unit known as an attitude and heading reference system (AHRS) that provides 3D orientation of the marine vessel 10 by integrating gyroscopic measurements, accelerometer data, and magnetometer data. In alternative embodiments, a gyroscope, motion reference unit (MRU), inertial measurement unit (IMU), electronic compass, differential GPS, or any combination of the above-mentioned devices could additionally or alternatively be included in the navigation system 38. The navigation system 38 may also provide the vessel speed to the control module 30, such as by noting how far the vessel 10 has traveled in a given period of time.

The control module 30 is also communicatively connected to user input devices, which include, but are not limited to, a steering wheel 40, a joystick 42, and a mode selection device 44. It should be understood that either the steering wheel 40 or the joystick 42 could be eliminated, and the other of the devices 42, 40 used as the sole user input device for initiating steering commands to steer the steerable component 16. Options that are selectable via the mode selection device 44 will be described further herein below. Note that the mode selection device 44 could be a keypad or gauge, or a touch screen or a video screen with selectable icons or a scrollable menu.

Figure 2:
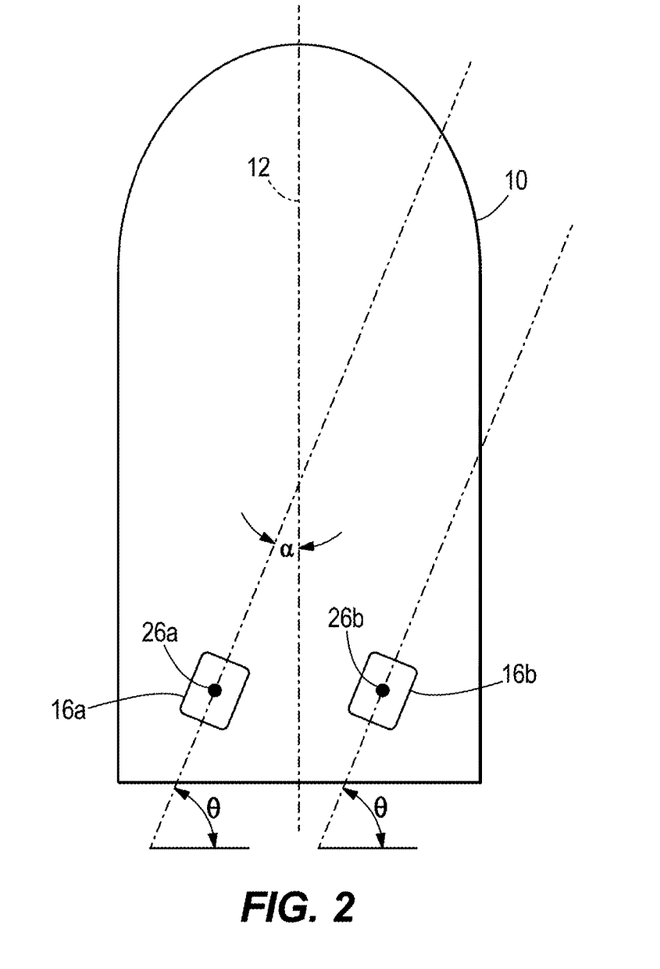
FIG. 2 illustrates a schematic view of a marine vessel having two steerable components, and the steering angles of the steerable components.

Now referring to FIG. 2, the capability of the steerable component 16 to be steered to a plurality of positions will be described. FIG. 2 illustrates two steerable components 16a, 16b. Both of the steerable components could comprise pod drives, or could comprise any of the other steerable components mentioned herein above. It should be understood that the principles discussed herein with reference to the two steerable components 16a, 16b are equally applicable to the single steerable component 16 of FIG. 1, unless noted otherwise. The principles discussed herein also apply when more than two steerable components are provided on the marine vessel 10, and the number of steerable components is not limiting on the scope of the present disclosure. As shown in FIG. 2, both of the steerable components 16a, 16b are steered around their vertical steering axes 26a, 26b to a steering angle of $\theta$, where $\theta$ is related to a virtual center line 12 of the marine vessel 10 according to the equation $\theta=90-\alpha$, where $\alpha$ is an angle of a thrust vector produced by a propeller associated with each steerable component 16a, 16b with respect to the virtual center line 12.

Referring now also to FIG. 4, the steering wheel 40 is rotatable to a plurality of positions (see solid line and dashed line positions), and the steerable component 16, 16a, 16b is rotatable to affect a direction of movement of the vessel 10 in response to rotation of the steering wheel 40 in a manual steering mode. For example, a certain degree of actuation of the steering wheel 40 will correspond to a particular steering angle $\theta$ of the steerable components 16, 16a, 16b, according to a drive angle map stored in the memory of the control module 30. If the steering wheel 40 is turned clockwise from a neutral, centered position shown in solid lines at 41 by an angle A (or percentage of total allowable wheel angle) to the position shown in dashed lines at 43, this angle or percentage A maps to a particular steering angle $\theta$ of the steerable components 16, 16a, 16b. For ease of explanation, the steerable components 16a, 16b are assumed to be turned to the same steering angle $\theta$ mapped from the position of the steering wheel 40, although it should be understood that in some embodiments, the steerable components 16a, 16b are instead steered to independently-calculated steering angles that are meant to achieve a particular movement of the marine vessel 10. Although a steering wheel 40 is shown in FIG. 4 for exemplary purposes, movement of the joystick 42 around its axis could also be mapped to a particular steering angle $\theta$ of the steerable components 16, 16a, 16b. Note that hereon forward, the steerable components 16, 16a, 16b will be referred to as the steerable component(s) 16 for purposes of brevity, it being understood that this reference could include one, two, or more steerable components.

In addition to the manual steering mode described above, the marine vessel 10 can also be controlled in an auto-heading or a waypoint tracking mode, as disclosed in U.S. Pat. No. 9,377,780, which was incorporated by reference above.

Either one of these two types of functions (auto-heading or waypoint tracking) may be engaged after an operator has driven the vessel 10 into open water and the marine vessel 10 is underway. In the auto-heading mode, the operator of the marine vessel may choose to automatically maintain propulsion of the vessel 10 at a predetermined heading. To initiate auto-heading, for example, the operator of the vessel 10 could select a numerical heading from a keypad or a touch screen and select the auto-heading feature, for example via the same keypad or touchscreen or via the mode selection device 44. Alternatively, the operator could manipulate the steering wheel 40 or joystick 42 until the vessel 10 is oriented to a desired heading, and then select the auto-heading feature via the mode selection device 44. For example, the mode selection device 44 may include an auto-heading button 46 (FIG. 1) for purposes of initiating the auto-heading mode. The control module 30 would then maintain the marine vessel 10 at the commanded heading for an extended period of time with little or no operator input required. For example, if wind, waves, or the like push the marine vessel 10 off this heading, the control module 30 would determine the corrective action needed to return the vessel 10 to the commanded heading, and provide steering and thrust commands to the vessel's propulsion units so as to correct the direction of the marine vessel 10 such that it thereafter continues at the commanded heading.

In the waypoint tracking mode, the marine vessel 10 is automatically guided to a point (e.g., a global position defined in terms of latitude and longitude) or to several points along a track. To initiate waypoint tracking mode, for example, the operator of the marine vessel 10 may select a point or track from a chart plotter and select the waypoint tracking mode. The control module 30 then determines a commanded heading according to information provided by the chart plotter. The control module then automatically guides the marine vessel 10 to each point along the track (or to the single selected point) by providing steering and thrust commands to the propulsion units. If the marine vessel 10 veers off course between two points, such as due to the effect of wind, waves, or the like, the control module 30 determines the corrective action needed to resume the commanded heading so as to guide the vessel 10 back to the desired point and/or track. The control module 30 provides steering and/or thrust commands to the steerable component(s) 16 and propulsion units to achieve such corrective action.

In both the auto-heading and waypoint tracking modes, the control module 30 uses a heading feedback signal (indicating an estimate of the heading at which the marine vessel 10 is actually being propelled) from the navigation system 38 to determine whether correction needs to be made to the actual heading of the marine vessel 10 in order to maintain the commanded heading. The control module 30 uses the heading feedback signal to determine how and to what extent the steerable component(s) 16 must be steered (and/or what thrust must be provided by the propulsion system) in order to re-orient the marine vessel 10 to the commanded heading. For example, if the operator has engaged auto-heading and has selected a predetermined heading of 350 degrees, but external forces have caused the marine vessel 10 to orient itself to a heading of 345 degrees, the control module 30 will use a heading feedback signal of 345 degrees to perform calculations to determine to what extent the steerable component(s) 16 must be steered (and/or what thrust must be provided) in order to re-orient the marine vessel to a heading of 350 degrees. The control module 30 performs similar calculations to provide similar correction when the marine vessel 10 is operating in the waypoint tracking mode, only the latter mode may also include directing the vessel 10 back to a desired course between the two geographical points. Such automatic correction of the heading of the marine vessel can be achieved according to the principles described in U.S. Pat. Nos. 7,267,068; 7,305,928; and/or U.S. Pat. No. 9,039,468, the disclosures of which are hereby incorporated by reference in their entirety.

Waypoint tracking methods use GPS data in order to compare a vessel's actual global position with its desired global position. For example, the vessel's steerable component(s) 16 and/or propulsion module(s) (which may be the same device) are automatically controlled to propel the vessel 10 to a desired global position (defined by latitude and longitude). The control module 30 controls thrust and angular orientation of the propulsion module(s) and/or steerable components and thereby acts as a joystick and calculates left/right, fore/aft, and yaw commands required to drive the vessel's position error to zero. The control module 30 can control one or more propulsion modules and/or steerable components (again, which may be the same device) to do so, which may be located at the rear of the vessel 10 such as with outboards or stern drives, under the vessel such as with pod drives, or at the front of the vessel such as with bow thrusters or trolling motors.

For example, if an actual GPS position of the vessel 10 is not equal to the desired GPS position setpoint, the control module 30 will calculate a course over ground (COG) that the vessel 10 must travel to reach the GPS position setpoint. The control module 30 determines when and how much corrective action to take according to a three-dimensional (left/right, fore/aft, and yaw) proportional, integral, and derivative (PID) control algorithm. The integral term allows the algorithm to reject constant and slowly varying disturbances (e.g., current) while maintaining near zero position error. The proportional and derivative terms handle the quickly varying disturbances. The integral term is considered to have memory and can take time to increase or decrease, especially if the disturbance forces grow. The PID control algorithm outputs a desired force in the forward/back and left/right directions with reference to the marine vessel 10, along with a desired yaw moment relative to the marine vessel 10 in order to null the error elements. The computed force and moment elements are then transmitted to the vessel maneuvering system, which delivers the requested forces and moments by positioning the independently steerable propulsion module(s) and/or steerable components 16, controlling the power provided to the propellers of each module, and controlling the thrust vector directions of both modules.

Figure 5:
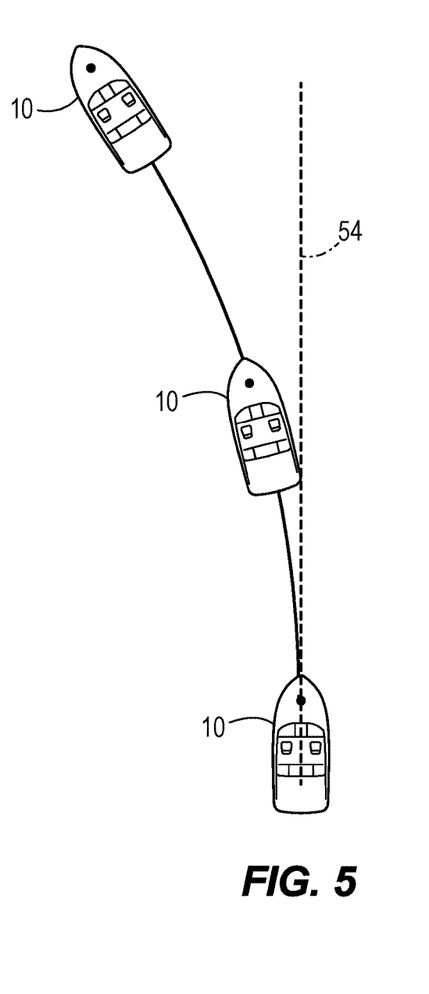
FIG. 5 illustrates movement of a vessel without active control.
Figure 6:
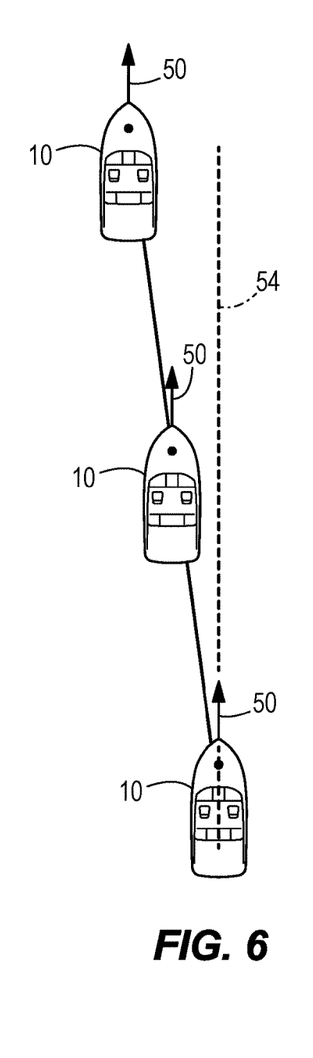
FIG. 6 illustrates movement of a vessel when auto heading is engaged.

The present inventors have discovered through research and development that waypoint tracking concepts can also be used to improve normal, straight-forward travel of a vessel 10 that is underway. Referring to FIG. 5, with conventional systems, the path of the vessel 10 is often affected by wind or current, so even if the operator has the steering wheel 40 in a straight-ahead position, the vessel 10 may drift to one side or another of a straight-ahead course, shown by dashed line 54. This requires the operator to constantly hold and re-adjust the steering wheel 40 or to engage an autopilot system to maintain a particular heading or course. However, even when in auto-heading, the vessel 10 will not maintain a straight-ahead track or course (see dashed line 54), but only a given heading 50, as shown in FIG. 6.

Figure 7:
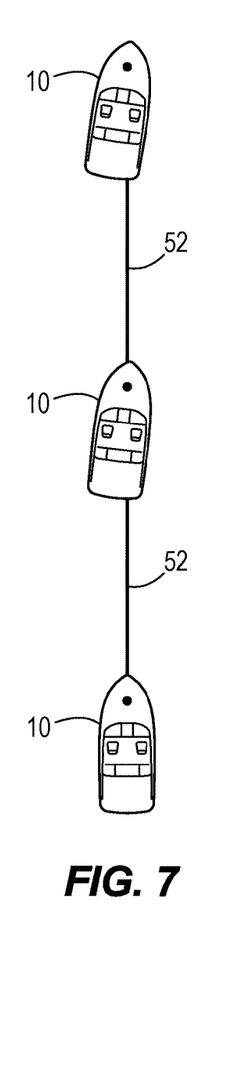
FIG. 7 illustrates movement of a vessel when an auto-waypoint method according to the present disclosure is engaged.

In contrast, the present method (see FIG. 7) allows the vessel 10 to maintain a straight ahead course 52 despite current, wind, or other environmental factors, without requiring the operator to engage autopilot or waypoint tracking. Using feedback from the navigation system 38, the auto-waypoint algorithm described herein makes slight adjustments to the steering angle θ of the steerable component(s) 16 to automatically compensate for external forces on the vessel 10. In one example, when the steering wheel 40 enters a neutral, centered steering position 41 (FIG. 4), the system will set a virtual waypoint based on the vessel's current heading and will then use the control module 30 to maintain a course 52 to that virtual waypoint. The control module 30 will cause the steerable component(s) 16 to make slight steering adjustments, independent of the steering wheel 40, in order to stay on course to the virtual waypoint. The control module 30 will continue to maintain the vessel 10 on this course 52 until the steering wheel 40 is moved out of the neutral, centered position 41.

In one example, the mode selection device 44 is configured to initiate an auto-waypoint mode of the system, such as by way of actuation of an auto-waypoint mode button 48 (FIG. 1). In response to initiation of the auto-waypoint mode, the control module 30 sets a course 52 for the vessel 10 based on a current position of the steering wheel 40 and the vessel's current global position and current heading. The control module 30 thereafter commands the steerable component 16 to rotate automatically to counteract external forces on the vessel 10 to thereby maintain the vessel's set course 52. In another example, the auto-waypoint method may be implemented without a mode selection device 44. For example, the system 14 could be programmed to always default to the auto-waypoint mode unless navigational data is not available from the navigation system 38. In other words, initiation of the auto-waypoint mode could be upon startup of the system 14. In another example in which the auto-waypoint mode is normally on, the mode selection device 44 could be used to turn a default auto-waypoint mode off instead of on.

Figure 8:
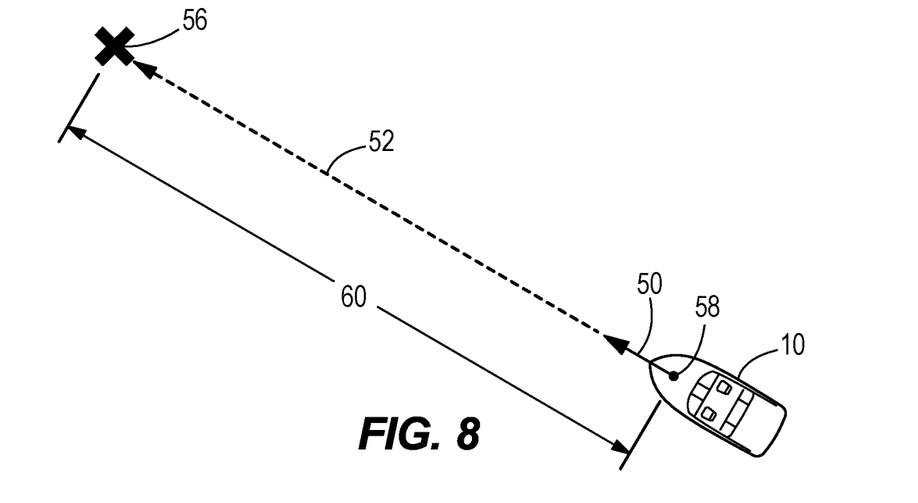
FIG. 8 shows a vessel and a straight ahead course.

Turning to FIG. 8, the control module 30 may set a virtual waypoint 56 by projecting the vessel's current global position (e.g. at preselected point 58 on vessel 10) out by a predetermined distance 60 and sets the course 52 toward the virtual waypoint 56. More specifically, in response to the steering wheel 40 being rotated to a neutral, centered position (shown in solid lines at 41 in FIG. 4) upon initiation of the auto-waypoint mode, the control module 30 calculates the virtual waypoint 56 by projecting the vessel's current global position 58 out by the predetermined distance 60 at the vessel's current heading 50 and sets the course 52 as a straight line toward the virtual waypoint 56. This can be done using known navigational formulas, such as a rearrangement of the haversine formula. The virtual waypoint 56 to which the vessel 10 is directed can be one that is significantly far away such that it is not expected to be reached during the vessel's travel, for example, 10 miles. This way, the vessel 10 will not stop upon reaching the virtual waypoint 56, since the virtual waypoint 56 is being used merely as a virtual target for purposes of controlling the vessel 10 to follow a straight-ahead track. The system 14 will automatically make slight adjustments to maintain the course 52, similar to the adjustments described herein above with respect to the waypoint tracking mode.

In one example of the present system 14, in response to the steering wheel 40 being rotated to the neutral, centered position 41 upon initiation of the auto-waypoint mode, the control module 30 establishes a detent for the steering wheel 40 around the neutral, centered position 41. A detent in the steering profile may help the operator identify when the wheel 40 is centered, such as by providing physical feedback upon rotation into the neutral, centered position 41. The detent may also provide slight counteracting force against accidental rotation of the steering wheel 40 out of the neutral, centered position 41. The detent can be provided by the steering assist mechanism, such as a servo motor, in the steering wheel 40. The detent can be established only when the auto-waypoint mode is enabled and GPS data is valid. A visual or audio signal could be additionally or alternatively used to indicate when the steering wheel 40 is centered.

Different results may occur if the steering wheel 40 is rotated out of the neutral, centered position, for example, to the non-neutral, angled position shown in dashed lines at 43 in FIG. 4. In one example, in response to the steering wheel 40 being rotated out of the neutral, centered position while the course 52 is the straight line toward the virtual waypoint 56, the control module 30 cancels the auto-waypoint mode and returns the system 14 to the manual steering mode.

Figure 9:
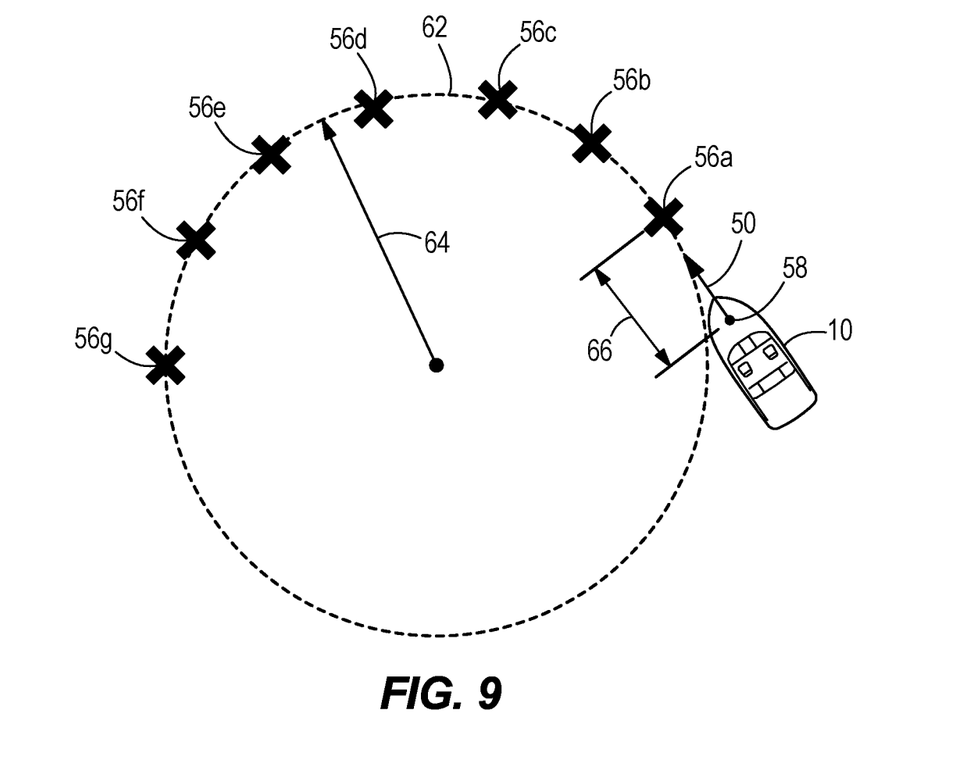
FIG. 9 shows a vessel and an arced course having a turning radius.

In another example, with reference to FIG. 9, in response to the steering wheel 40 being rotated out of the neutral, centered position 41 while the course 52 is the straight line toward the virtual waypoint 56, the control module 30 sets a series of virtual waypoints 56a-56g by projecting the vessel's current global position 58 out at progressively increasing angles from the vessel's current heading 50, and sets the course 62 as being along an arc including the series of virtual waypoints 56a-56g. The control module 30 may calculate a radius 64 of the arc based on the steering wheel's current position and a current speed of the vessel 10. The radius 64 could also or instead be determined based on the vessel's current heading 50, vessel type, vessel size, hull design, or user preferences. A relationship between wheel angle and/or any of the above-noted variables and turning radius could be saved in the memory of the controller in a look-up table or similar an input-output map. Thereafter, the control module 30 is programmed to maintain the vessel 10 on the course 62 such that the vessel 10 will maintain a constant turning radius. The system 14 will automatically make slight adjustments to maintain that turning radius, similar to the adjustments described herein above with respect to the waypoint tracking mode.

Each virtual waypoint 56a-56g can be set at a predetermined distance from another. Shorter distances between waypoints will result in the vessel 10 keeping to a more arced course 62, while longer distances will result in the vessel keeping to a course 62 with a number of short, straight line segments between virtual waypoints. The distance between each virtual waypoint 56a-56g can be programmed into the control module 30 or can be selected by the operator. The distance between each virtual waypoint may be determined by the incremental angles at which the vessel's current global position 58 is projected. For instance, in FIG. 9, the vessel's current global position 58 is first projected out at zero degrees (i.e. at the vessel's current heading 50) by the distance 66 to set the first virtual waypoint 56a. The virtual waypoint 56b may, for example, be at 5 degrees counterclockwise from the vessel's initial current heading 50, and at distance 66 from the waypoint 56a. The waypoints 56c-56g can be calculated in a similar manner.

In another example, each virtual waypoint 56a-56g is calculated upon the immediately prior waypoint being reached, with the same offset angle from the vessel's then-current heading and the same distance 66 being used each time to calculate a new waypoint. Note that this method could result in more cross-track error than the method described above, where all angles are based off the vessel's initial current heading 50. In yet another example, a method like that described in U.S. Patent Application Publication No. 2007/0162207 could be used to maintain a constant turning radius.

In one example, in response to the steering wheel 40 being rotated to a non-neutral, angled position 43 upon initiation of the auto-waypoint mode, the control module 30 sets the series of virtual waypoints 56a-56g by projecting the vessel's current global position 58 out at progressively increasing angles from the vessel's current heading 50, and sets the course 62 as being along an arc including the series of virtual waypoints 56a-56b. Therefore, the course 62 having a constant turning radius may also be set immediately upon initiation of the auto-waypoint mode.

Note that whether the vessel's course 62 along the arc having radius 64 is set immediately upon initiation of the auto-waypoint mode or in response to the steering wheel 40 being moved out of the neutral, centered position while the vessel 10 is on a straight-ahead course 52, the radius 64 may change in response to user input or in response to a change in vessel operating conditions. For example, if the vessel speed or wheel angle is changed, then a new theoretical turning radius 64 may be determined. More specifically, in response to a change in the vessel's current speed while the course 62 is along the arc including the series of virtual waypoints 56a-56g, the control module 30 calculates a new radius 64 of the arc based on the steering wheel's current position and the new current speed of the vessel 10. Even if the radius 64 of the arc changes, the auto-waypoint mode may continue. Alternatively, if the operator moves the steering wheel 40 while a course 62 with a particular turning radius is being followed, the auto-waypoint mode may be cancelled, and the system may return to manual steering.

In either the straight line or constant turning radius modes, a chart plotter of the system 14 could be made to present a line that projects the course 52 or 62 that was automatically generated by initiation of the auto-waypoint mode. The chart plotter could show the progress of the vessel along the course 52 or 62.

If the GPS data from the navigation system 38 is not available or is invalid, the auto-waypoint feature may not be available and the system 14 will default to manual steering. If the system 14 cannot maintain the course 52 or 62 with a reasonable amount of correction (due for example to strong external conditions acting on the vessel 10), the auto-waypoint mode may similarly be made unavailable and the steering mode will default to manual. The amount of correction that is "reasonable" or allowed can be calibrated into the system or chosen by the operator. For example, in response to the control module 30 not being able to maintain the course 52 or 62 with a calibrated amount of movement of the steerable component 16, the control module 30 cancels the auto-waypoint mode and returns the system to the manual steering mode. The amount of movement could be a number of times that the steerable component 16 has moved to keep the vessel 10 on course and/or the magnitude of the angles to which the steerable component is required to rotate to keep the vessel 10 on course. The control module 30 may be programmed to have a noise generated or a message flash at the helm to indicate that the steering mode is reverting to manual.

In one example, the mode selection device 44 is also configured to cancel the auto-waypoint mode, in response to which the control module 30 returns the system to the manual steering mode. Such cancellation of the auto-waypoint mode could be made in response to pressing of a manual steering button 68 (FIG. 1) on the mode selection device 44. In other examples, the auto-waypoint mode could be cancelled by subsequent pressing of the auto-waypoint mode button 48.

Figure 10:
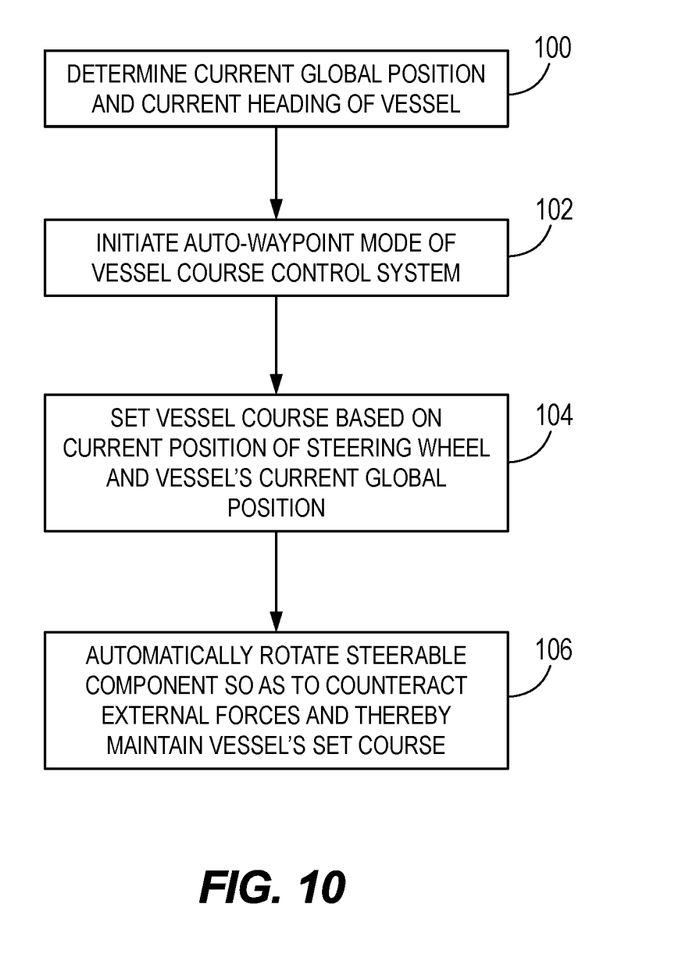
FIG. 10 shows one example of a method according to the present disclosure.

A method for controlling a course of a marine vessel 10 powered by a marine engine 18 as it moves in a body of water 31 will now be described with respect to FIG. 10. As shown at 100, the method includes determining a current global position 58 and a current heading 50 of the vessel 10. As shown at 102, the method includes initiating an auto-waypoint mode of a vessel course control system 14. As shown at 104, in response to initiation of the auto-waypoint mode, the method includes setting a course 52 or 62 for the vessel 10 based on a current position of a steering wheel 40 of the system 14 and the vessel's current global position 58. As shown at 106, the method then includes automatically rotating a steerable component 16 coupled to the vessel 10 and rotatable to affect a direction of movement of the vessel 10 so as to counteract external forces on the vessel 10 and thereby to maintain the vessel's set course 52 or 62.

Whether to use the auto-waypoint or auto-turning radius function or to use manual steering can be based on factors other than whether an auto-waypoint mode button 48 or a manual steering button 68 has been pressed and GPS data is available and valid. In one example, the auto-waypoint mode is not enabled until the steering wheel 40 has been in the neutral, centered position 41 for more than a predetermined amount of time. Similarly, the auto-turning radius function might not be enabled until the wheel 40 has been at a particular position and the vessel 10 has been at a constant speed for longer than a predetermined period of time.

The auto-waypoint feature allows an operator to navigate to a landmark or buoy more easily using line of sight. The operator can do so without having to pre-set a waypoint or set a waypoint on the fly. The waypoint is instead automatically created by pointing the vessel 10 directly at the point of interest and selecting the auto-waypoint mode button 48. The operator will not need to hold or adjust the steering wheel 40 to maintain the vessel's initial course. This feature could be implemented on smaller boats that do not have chart plotters or other complex vessel navigation systems, but of course could be implemented on vessels with those types of systems as well.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and methods described herein may be used alone or in combination with other systems or methods. It is to be expected that various equivalents, alternatives and modifications are possible.

What is claimed is:

1. A system for controlling a course of a marine vessel powered by a marine engine as it moves in a body of water, the system comprising:
   a steering wheel rotatable to a plurality of positions;
   a steerable component comprising a pod drive, an outboard motor, a stern drive, a jet drive, or a propeller capable of producing a thrust vector coupled to the vessel and rotatable about a steering axis to affect a direction of movement of the vessel in response to rotation of the steering wheel in a manual steering mode;
   a navigation system that determines a current global position and a current heading of the vessel;
   a mode selection device configured to initiate an auto-waypoint mode of the system; and a control module in signal communication with the steering wheel, the steerable component, the navigation system, and the mode selection device;

wherein, in response to initiation of the auto-waypoint mode, the control module sets a virtual waypoint and sets a course for the vessel toward the virtual waypoint based on a current position of the steering wheel and the vessel's current global position;

wherein the control module sets the virtual waypoint by projecting the vessel's current global position out by a predetermined distance and at an angle from the vessel's current heading the angle being based on the current position of the steering wheel; and wherein the control module thereafter commands the steerable component to rotate automatically and independently of the current position of the steering wheel, so as to counteract external forces on the vessel due to wind, waves, current, or other environmental factors, to thereby maintain the vessel on the set course toward the virtual waypoint.

2. The system of claim 1, wherein in response to the steering wheel being rotated to a neutral, centered position upon initiation of the auto-waypoint mode, the control module calculates the virtual waypoint by projecting the vessel's current global position out by the predetermined distance at zero degrees from the vessel's current heading and sets the course as a straight line toward the virtual waypoint.

3. The system of claim 2, wherein in response to the steering wheel being rotated to the neutral, centered position upon initiation of the auto-waypoint mode, the control module establishes a detent for the steering wheel around the neutral, centered position.

4. The system of claim 2, wherein in response to the steering wheel being rotated out of the neutral, centered position while the course is the straight line toward the virtual waypoint, the control module cancels the auto-waypoint mode and returns the system to the manual steering mode.

5. The system of claim 2, wherein in response to the steering wheel being rotated out of the neutral, centered position while the course is the straight line toward the virtual waypoint, the control module sets a series of virtual waypoints, each virtual waypoint in the series of virtual waypoints being set by projecting the vessel's current global position out at progressively increasing angles from the vessel's current heading, and sets the course as being along an arc including the series of virtual waypoints.

6. The system of claim 1, wherein in response to the steering wheel being rotated to a non-neutral, angled position upon initiation of the auto-waypoint mode, the control module sets a series of virtual waypoints, each virtual waypoint in the series of virtual waypoints being set by projecting the vessel's current global position out at progressively increasing angles from the vessel's current heading, and sets the course as being along an arc including the series of virtual waypoints.

7. The system of claim 6, wherein in response to the steering wheel being rotated to the non-neutral, angled position upon initiation of the auto-waypoint mode, the control module calculates a radius of the arc based on the steering wheel's current position and a current speed of the vessel.

8. The system of claim 7, wherein in response to a change in the vessel's current speed while the course is along the arc including the series of virtual waypoints, the control module calculates a new radius of the arc based on the steering wheel's current position and the new current speed of the vessel.

9. The system of claim 1, wherein in response to the control module not being able to maintain the set course with a calibrated amount of movement of the steerable component, the control module cancels the auto-waypoint mode and returns the system to the manual steering mode.

10. The system of claim 1, wherein the mode selection device is also configured to cancel the auto-waypoint mode, in response to which the control module returns the system to the manual steering mode.

11. A method for controlling a course of a marine vessel powered by a marine engine as it moves in a body of water, the method comprising:

determining a current global position and a current heading of the vessel;

initiating an auto-waypoint mode of a vessel course control system;

in response to initiation of the auto-waypoint mode, a control module setting a virtual waypoint and setting a course for the vessel toward the virtual waypoint based on a current position of a steering wheel of the system and the vessel's current global position, wherein setting the virtual waypoint comprises projecting the vessel's current global position out by a predetermined distance and at an angle from the vessel's current heading, the angle being based on the current position of the steering wheel; and automatically rotating a steerable component comprising a pod drive, an outboard motor, a stern drive, a jet drive, or a propeller capable of producing a thrust vector, which is coupled to the vessel and rotatable about a steering axis to affect a direction of movement of the vessel independently of the current position of the steering wheel so as to counteract external forces on the vessel due to wind, waves, current, or other environmental factors, and thereby maintaining the vessel on the set course toward the virtual waypoint.

12. The method of claim 11, wherein in response to the steering wheel being rotated to a neutral, centered position upon initiation of the auto-waypoint mode, the method further comprises calculating the virtual waypoint by projecting the vessel's current global position out by the predetermined distance at zero degrees from the vessel's current heading and setting the course as a straight line toward the virtual waypoint.

13. The method of claim 12, wherein in response to the steering wheel being rotated out of the neutral, centered position while the course is the straight line toward the virtual waypoint, the method further comprises canceling the auto-waypoint mode and returning the system to a manual steering mode, in which a position of the steering wheel determines a position of the steerable component.

14. The method of claim 12, wherein in response to the steering wheel being rotated out of the neutral, centered position while the course is the straight line toward the virtual waypoint, the method includes setting a series of virtual waypoints, each virtual waypoint in the series of virtual waypoints being set by projecting the vessel's current global position out at progressively increasing angles from the vessel's current heading, and setting the course as being along an arc including the series of virtual waypoints.

15. The method of claim 11, wherein in response to the steering wheel being rotated to a non-neutral, angled position upon initiation of the auto-waypoint mode, the method includes setting a series of virtual waypoints, each virtual waypoint in the series of virtual waypoints being set by projecting the vessel's current global position out at progressively increasing angles from the vessel's current heading, and setting the course as being along an arc including the series of virtual waypoints.

16. The method of claim 15, wherein in response to the steering wheel being rotated to the non-neutral, angled position upon initiation of the auto-waypoint mode, the method includes calculating a radius of the arc based on the steering wheel's current position and a current speed of the vessel.

17. The method of claim 16, wherein in response to a change in the vessel's current speed while the course is along the arc including the series of virtual waypoints, the method includes calculating a new radius of the arc based on the steering wheel's current position and the new current speed of the vessel.

18. The method of claim 11, wherein in response to a determination that the vessel's current global position and current heading are not available or are not valid, the method includes cancelling the auto-waypoint mode and returning the system to a manual steering mode, in which a position of the steering wheel determines a position of the steerable component.

* * * * *